(12) United States Patent
Schmidt et al.

(10) Patent No.: US 12,736,647 B2
(45) Date of Patent: Sep. 15, 2026

(54) DEVICE FOR CONTROLLING AN ULTRASONIC TRANSDUCER AND ULTRASONIC MEASURING DEVICE HAVING SUCH A CONTROL DEVICE FOR THE ULTRASONIC TRANSDUCER

(71) Applicant: ELMOS Semiconductor SE, Dortmund (DE)

(72) Inventors: Andre Schmidt, Wiehl (DE); Dennis Kreiß, Dortmund (DE); Guido Schlautmann, Altenberge (DE); Stefanie Heppekausen, Essen (DE)

(73) Assignee: ELMOS Semiconductor SE, Leverkusen (DE)

( * ) Notice: Subject to any disclaimer, the term of this patent is extended or adjusted under 35 U.S.C. 154(b) by 466 days.

(21) Appl. No.: 18/128,870

(22) Filed: Mar. 30, 2023

(65) Prior Publication Data

US 2023/0350040 A1 Nov. 2, 2023

(51) Int. Cl.
*G01S 7/523* (2006.01)
*G01S 15/931* (2020.01)

(52) U.S. Cl.
CPC ......... *G01S 7/523* (2013.01); *G01S 2015/932* (2013.01)

(58) Field of Classification Search
CPC .. G01S 2015/932; G01S 15/931; G01S 7/523; G01S 7/521; G01S 7/52004; G01S 15/101; B06B 2201/70; B06B 1/0215; B06B 2201/40
USPC ............................................................ 367/13
See application file for complete search history.

(56) References Cited

U.S. PATENT DOCUMENTS

| | | | | |
|---|---|---|---|---|
| 9,669,427 | B2 * | 6/2017 | Nielsen | B06B 1/0215 |
| 12,070,772 | B2 * | 8/2024 | Axman | B06B 1/0215 |
| 2010/0137720 | A1 * | 6/2010 | Hanazawa | H02M 7/538 327/108 |

(Continued)

FOREIGN PATENT DOCUMENTS

| | | | |
|---|---|---|---|
| EP | 3537177 A1 | 9/2019 | |
| WO | WO-2014019876 A1 * | 2/2014 | G01S 7/524 |
| WO | WO-2014166835 A1 * | 10/2014 | G01S 15/931 |

OTHER PUBLICATIONS

WO-2014166835-A1 (machine translation) (Year: 2014).*
WO-2014019876-A1 (machine translation) (Year: 2014).*

*Primary Examiner* — Yuqing Xiao
*Assistant Examiner* — Christopher Richard Walker
(74) *Attorney, Agent, or Firm* — Mindful IP PLLC

(57) ABSTRACT

An ultrasonic measuring device includes an ultrasonic transducer without voltage converter having two transducer terminals to which an alternately reversible control voltage can be applied for emitting an ultrasonic burst signal in a control phase and to which an evaluation voltage is applied in a reception phase. The ultrasonic transducer decays in a decay phase between the control phase and the reception phase. A control unit generates the control voltage. The control unit comprises a full bridge circuit with two half bridge circuits, each comprising two semiconductor driving switches, which are connected to the two terminals of the ultrasonic transducer. An evaluation unit is provided with two input terminals, each of which is connected to the terminals of the ultrasonic transducer via a connection line. Voltage limiting elements in the two terminal lines limit the voltage applied to the input terminals of the amplifier.

14 Claims, 4 Drawing Sheets

(56) References Cited

U.S. PATENT DOCUMENTS

| | | | | |
|---|---|---|---|---|
| 2010/0254221 | A1* | 10/2010 | Smith | B06B 1/0269 367/137 |
| 2013/0303919 | A1* | 11/2013 | Corl | A61B 8/445 600/467 |
| 2016/0284967 | A1* | 9/2016 | Kruecken | H10N 30/802 |

* cited by examiner

DEVICE FOR CONTROLLING AN ULTRASONIC TRANSDUCER AND ULTRASONIC MEASURING DEVICE HAVING SUCH A CONTROL DEVICE FOR THE ULTRASONIC TRANSDUCER

CROSS REFERENCE TO RELATED APPLICATIONS

The present patent application claims the priority of European patent application 22 167 318.9 filed on Apr. 8, 2022, the disclosure of which is incorporated by reference in the present patent application in its entirety.

TECHNICAL FIELD

The disclosure relates to a device for controlling an ultrasonic transducer and for evaluating measuring signals delivered by the ultrasonic transducer, and an ultrasonic measuring device having such a control and evaluation device, in particular for the use as a distance measurement in vehicles and in particular as a vehicle parking aid.

BACKGROUND

Ultrasonic measuring systems are particularly used for distance and range measurement, respectively. A substantial field of application of such ultrasonic measuring systems is their use as a parking aid for vehicles. However, ultrasonic measuring systems are also used for monitoring rooms and for detecting persons in monitored rooms.

In general, it applies for ultrasonic measuring systems that ultrasonic waves are emitted from an ultrasonic transmitter and, when they hit an obstacle, are reflected by the obstacle and received by an ultrasonic receiver. Based on the transit time between the emission of ultrasonic waves and the reception of echoes of the emitted ultrasonic waves, the distance of the obstacle to the ultrasonic transmitter or receiver can be concluded.

In order to be able to reliably detect echo signals coming from more distant objects, the energy of the emitted ultrasonic waves should be sufficiently high. Therefore, electroacoustic ultrasonic converters of such ultrasonic measuring systems are operated at the input with a transformer or voltage converter, respectively. However, such a component increases the manufacturing costs, which has a negative effect particularly in the case of parking aids for vehicles inasmuch as such parking aids usually comprise several ultrasonic converters.

As described previously, an ultrasonic measuring system may include an ultrasonic transmitter and an ultrasonic receiver, which are formed as separate individual components. However, it is much more advantageous, particularly in terms of reduced space requirements and lower production costs, if an ultrasonic converter is used which operates as an ultrasonic transmitter in a transmission interval and as an ultrasonic receiver in a reception interval following the transmission interval. Such ultrasonic converters are sometimes referred to as ultrasonic transducers.

The control and evaluation electronics for an ultrasonic measuring system integrated in an IC chip, for example, has several terminal pins for, on the one hand, the output of control voltages for the excitation of the ultrasonic transmitter for the generation of ultrasonic waves and for the input of evaluation voltages of the ultrasonic receiver when an echo is received. The manufacturing costs of an IC chip significantly depend on the required chip area. Each terminal pin requires chip area to be provided. In this respect, it is therefore desirable for the manufacture of IC chips to minimize the number of terminal pins or terminal pads.

From WO-A-2014/166835 a device for measurement by means of ultrasound, in particular as a parking aid for vehicles, is known, in which the control of the ultrasonic transducer as well as the evaluation of the echo signals takes place in an IC. The IC has four output terminals, two for outputting the control signals for the ultrasonic transducer and two further terminals via which the echo signals converted into electrical signals are fed to the IC for the purpose of evaluation.

A further ultrasonic measuring device having an ultrasonic transducer is described in EP-A-3 537 177.

SUMMARY

It is an object of the disclosure to provide an ultrasonic measuring device, the control and evaluation electronics of which can be integrated in an IC chip with a minimum number of terminal pins or terminal pads, respectively.

The object of the disclosure is achieved with the disclosure proposing a device for controlling an ultrasonic transducer and for evaluating measuring signals delivered by the ultrasonic transducer, the device being provided with

- an integrated circuit having two IC terminals led to the outside for electrical connection to an ultrasonic transducer,
- wherein an alternately reversible control voltage can be applied to the IC terminals of the integrated circuit for emitting an ultrasonic burst signal in a control phase, and an evaluation voltage which can be output by the ultrasonic transducer is applied to the IC terminals of the integrated circuit when an ultrasonic echo signal is received in a reception phase,
- wherein the evaluation voltage is in the low-voltage range of more than 0 V and up to a few volts, in particular up to 10 V or up to 8 V or up to 5 V or up to 3.3 V or up to 1.8 V, and the control voltage is in the high-voltage range, which comprises voltages that are greater than those of the low-voltage range by up to two powers of ten,
- a control unit formed as a component of the integrated circuit for generating the control voltage, wherein the control unit is provided with a full bridge circuit arranged between a supply potential and a reference potential, in particular ground, with two half bridge circuits each having two semiconductor driving switches, whose two circuit nodes each connecting two semiconductor driving switches are electrically connected to the two IC terminals of the integrated circuit,
- an evaluation unit formed as a component of the integrated circuit with an amplifier processing evaluation voltages in the low-voltage range with two input terminals which are electrically connected to the IC terminals of the integrated circuit,
- a voltage limiting element in each electrical connection between the input terminals of the amplifier and the two IC terminals of the integrated circuit, wherein both voltage limiting elements limit the voltage applied to the input terminals of the amplifier to a value in the low-voltage range,
- a control unit formed as a component of the integrated circuit for controlling the semiconductor driving switches,
- wherein, for applying the control voltage to the IC terminals of the integrated circuit, alternately two semiconductor driving switches of the four semiconductor driving switches can be switched on and two semiconductor driving switches can be switched off, and wherein for evaluating an evaluation voltage applied to the IC terminals of the integrated circuit, the four semiconductor driving switches are switched off.

Furthermore, the above-mentioned object of the disclosure is achieved with the disclosure proposing an ultrasonic measuring device provided with a controllable ultrasonic transducer without voltage converter which has two transducer terminals to which an alternately reversible control voltage can be applied for emitting an ultrasonic burst signal in a control phase and to which an evaluation voltage is applied when an ultrasonic echo signal is received in a reception phase, wherein the ultrasonic transducer decays in a decay phase between a control phase and a reception phase, wherein the evaluation voltage is in the low-voltage range of more than 0 V and up to a few volts, in particular up to 10 V or up to 8 V or up to 5 V or up to 3.3 V or up to 1.8 V, and the control voltage is in the high-voltage range, which comprises voltages that are greater than those of the low-voltage range by up to two powers of ten, a control unit for generating the control voltage, wherein the control unit is provided with a full bridge circuit arranged between a supply potential and a reference potential, in particular ground, with two half bridge circuits each having two semiconductor driving switches, whose two circuit nodes each connecting two semiconductor driving switches are each connected via a connection line to the two transducer terminals of the ultrasonic transducer, an evaluation unit with an amplifier processing evaluation voltages in the low-voltage range with two input terminals which are electrically connected to the two circuit nodes of the half bridge circuit of the control unit via terminal lines, a voltage limiting element in each terminal line, wherein both voltage limiting elements limit the voltage applied to the input terminals of the amplifier to a value in the low-voltage range, a control unit for controlling the semiconductor driving switch, wherein, for supplying the ultrasonic transducer with the control voltage for the purpose of emitting an ultrasonic burst signal, alternately two semiconductor driving switches, of the four semiconductor driving switches, can be switched on and two semiconductor driving switches can be switched off, and wherein for evaluating an evaluation voltage applied to the transducer terminals of the ultrasonic transducer, the four semiconductor driving switches are switched off.

The ultrasonic measuring device according to the disclosure operates with an ultrasonic transducer which does not use a voltage converter (like a switch mode power supply or a transformer). The ultrasonic transducer has two transducer terminals to which, in the control phase of a measurement interval, control voltages in the range of up to 150 V are alternately applied via a full bridge circuit in order to cause the ultrasonic transducer and, more specifically, its oscillating element to emit ultrasonic burst signals, which are a sequence of ultrasonic pulses.

Via the same terminals of the ultrasonic transducer via which the ultrasonic transducer is controlled with the control voltage in the control phase, the ultrasonic transducer outputs an evaluation voltage in the reception phase of the measurement interval, which results from the excitation of its oscillating element due to received ultrasonic signals, which are primarily the echo signal of the previously emitted ultrasonic burst signal. The magnitude of the evaluation voltage is about two powers of ten smaller than the excitation voltage. In this respect, the evaluation voltage can be referred to as a low voltage, while the control voltage is in the high-voltage range in contrast thereto and in relation to this low-voltage range.

The high-voltage range of the control electronics of an integrated circuit, i.e. the full bridge circuit of the control unit of the integrated circuit of the ultrasonic measuring device for generating the control voltage, and the low-voltage range, i.e. the evaluation unit of the ultrasonic measuring device with its amplifier of the integrated circuit having two input terminals, must therefore be adapted to be electrically decoupled from each other or at least blocked relative to each other. The integrated circuit has two IC terminals led to the outside, to which the ultrasonic transducer is connected via its two transducer terminals. The decoupling of the control unit within the integrated circuit from its two IC terminals in the reception phase, within which the evaluation of the evaluation voltage applied to the two IC terminals takes place, can be realized by switching off all semiconductor driving switches of the full bridge circuit. The decoupling of the evaluation unit, i.e. the decoupling of the input terminals of the amplifier from the two IC terminals in the control phase can be realized by voltage limiting elements of the integrated circuit, which are connected in each of the connection lines to the two IC terminals, wherein the connection nodes between the semiconductor driving switches of the two half bridge circuits of the full bridge circuit of the control unit are eventually also connected to these two connection lines. The control of the semiconductor driving switches of the full bridge circuit is performed by means of a control unit which, depending on the design of the voltage limiting elements, also controls them, and does so time-synchronized with the control of the semiconductor driving switches.

By “isolating” the high-voltage range from the low-voltage range of the electronics of the ultrasonic measuring device (control unit and evaluation unit as well as voltage limiting elements) as required according to the disclosure, it is possible to reduce the number of terminal pads of an IC chip comprising these electronics as integrated circuits to two terminal pads. Further terminal pads are not required in this respect. The electronics itself is arranged between a reference potential, typically ground, and a supply voltage, wherein, if necessary, a charge pump with externally connected charge capacitance can also be provided. The evaluation voltage amplified by the amplifier of the evaluation unit at the terminals of the ultrasonic transducer can be passed on externally by the IC chip via a terminal pad connected to the output of the amplifier.

The IC chip includes the aforementioned device according to the disclosure for controlling the ultrasonic transducer and for evaluating the measurement signals delivered by the ultrasonic transducer.

Surprisingly, it has been shown that the design according to the disclosure also provides sufficient protection against damage to the electronics by ESD discharges. This is primarily because the parasitic free-wheeling diodes of the four semiconductor driving switches of the full bridge circuit can be used to discharge ESD discharges either to ground or to the supply potential or, if present, via the external charge capacity to the reference potential, typically ground.

In an expedient configuration of the disclosure, it can be provided that the voltage limiting elements are each designed as a isolating semiconductor switch, which can be controlled by the control unit and is arranged in one of the connection lines, for selectively isolating and closing the electrical connection lines between the input terminals of the amplifier and the terminals of the ultrasonic transducer, wherein the isolating semiconductor switches are switched off when the ultrasonic transducer is supplied with the control voltage and are switched on for evaluating an evaluation voltage applied to the terminals of the ultrasonic transducer. In this configuration of the disclosure, the voltage limiting elements limit the voltage applied to the two input terminals of the amplifier to nearly 0 V, once it is assumed that an unopened semiconductor switch does not conduct any residual current.

As an alternative to the previously described configuration of the voltage limiting elements, these can also be designed as FET transistors switched as source followers, or as bipolar transistors switched as emitter followers. This wiring of FET or bipolar transistors allows the voltage at the inputs of the amplifier to be limited to a few volts, even in the control phase in which the connection lines to which the amplifier is connected carry the high-voltage control voltages.

In a further alternative configuration, the voltage limiting elements are formed as a circuit with a resistor arranged in one of the two connection lines and a voltage limiting diode, in particular a Zener diode, arranged between the two connection lines. This circuit achieves, with the same result as the other two alternatives for the configuration of the voltage limiting elements, that a maximum voltage of a few volts is applied to the input of the amplifier, even if the high control voltages are applied to the terminals of the ultrasonic transducer in the control phase, to which high voltages are then applied.

According to the disclosure, an ultrasonic transducer is used as described above. After being controlled, i.e. after its control phase, the ultrasonic transducer must first decay in order to then receive ultrasonic echo signals in the reception phase. Thus, there is a decay phase between the control phase and the reception phase. The decay phase should be as small as possible in order to be able to detect and evaluate echo signals coming from the close range, which are thus already present a short time after completion of the control phase. It is known to shorten this decay phase by damping measures for the oscillating element of the ultrasonic transducer.

In an insofar advantageous configuration of the disclosure, the ultrasonic measuring device is additionally provided with a damping circuit which is arranged in parallel with the two input terminals of the amplifier and has two further semiconductor switches by means of which the damping circuit can be connected to or disconnected from respectively one of the connection lines, wherein the two further semiconductor switches can be controlled by the control unit and are switched off during the supply of the ultrasonic transducer with the control voltage, are switched on thereafter and before the evaluation of an evaluation voltage applied to the terminals of the ultrasonic transducer for the purpose of damping the decay of the ultrasonic transducer in the decay phase and are switched off again during the evaluation of an evaluation voltage applied to the terminals of the ultrasonic transducer.

Advantageously, the previously described damping circuit has at least one resistor and/or at least one inductance.

Alternatively or in addition to the previously described damping circuit, in a further configuration of the disclosure, it can be provided that the control unit controls the semiconductor driving switches after supplying the ultrasonic transducer with the control voltage and before evaluating an evaluation voltage applied to the terminals of the ultrasonic transducer to generate single or double or multiple damping pulses, which can be applied to the ultrasonic transducer for damping its decay in the decay phase in a phase-shifted manner and particularly in phase opposition to the decay of the ultrasonic transducer.

In the previously described configuration of the disclosure, it is advantageous if, when several damping pulses are applied to the ultrasonic transducer, their energy is changed, in particular reduced from damping pulse to damping pulse.

Due to the control concept according to the disclosure, in which the ultrasonic transducer has no terminal connected to ground, the evaluation voltage of the ultrasonic transducer at the two terminals ranges between 0 V and a voltage value of a few volts. In this case, the evaluation of the evaluation voltage requires an amplifier whose operating point is at the center potential of the low-voltage range of the evaluation voltage. In an advantageous further development of the disclosure, this can be done by arranging an operating point setting circuit between the two input terminals of the amplifier, which circuit has two resistors of equal size and therebetween a potential terminal to which the center potential of the evaluation voltage range to be processed by the amplifier is applied, which range in turn is between 0 V and a few volts, in particular between 0 V and 10 V or between 0 V and 8 V or between 0 V and 5 V or between 0 V and 3.3 V or between 0 V and 1.8 V.

In an advantageous configuration of the control and evaluation device according to the disclosure, it is provided that the voltage limiting elements are each designed as an isolating semiconductor switch which can be controlled by the control unit and is arranged in one of the electrical connections between the input terminals of the amplifier and the terminals of the integrated circuit for selectively isolating and closing the electrical connection between the input terminals of the amplifier and the terminals of the integrated circuit of the ultrasonic transducer, wherein the isolating semiconductor switches are switched off for supplying the terminals of the integrated circuit with the control voltage and are switched on for evaluating an evaluation voltage applied to the terminals of the integrated circuit.

In a further advantageous configuration of the control and evaluation device according to the disclosure, it is provided that the voltage limiting elements are each designed as FET transistors switched as source followers, or as bipolar transistors switched as emitter followers.

In a further advantageous configuration of the control and evaluation device according to the disclosure, it is provided that the voltage limiting elements are each designed as a circuit comprising a resistor arranged in said electrical connection between the input terminals of the amplifier and the terminals of the integrated circuit and a voltage limiting diode, in particular a Zener diode, connecting the resistor to the reference potential.

In a further advantageous configuration of the control and evaluation device according to the disclosure, a damping circuit is provided which is formed as a component of the integrated circuit, is arranged in parallel with the two input terminals of the amplifier and has two further semiconductor switches by means of which the damping circuit can be connected to or disconnected from respectively one of the electrical connections between the input terminals of the amplifier and the terminals of the integrated circuit, wherein the two further semiconductor switches can be controlled by the control unit and are switched off during the supply of the terminals of the integrated circuit with the control voltage, are switched on thereafter and before the evaluation of an evaluation voltage applied to the terminals of the integrated circuit for the purpose of damping a decay of the ultrasonic transducer in a decay phase, and are switched off again during the evaluation of an evaluation voltage applied to the terminals of the integrated circuit.

In a further advantageous configuration of the control and evaluation device according to the disclosure, it is provided that the damping circuit has at least one resistor and/or at least one inductance.

In a further advantageous configuration of the control and evaluation device according to the disclosure, it is provided that the control unit controls the semiconductor driving switches after supplying the terminals of the integrated circuit with the control voltage and before evaluating an evaluation voltage applied to the terminals of the integrated circuit for generating single or double or multiple damping pulses, which can be applied to the ultrasonic transducer for damping a decay in a decay phase in a phase-shifted manner and particularly in phase opposition to the decay of the ultrasonic transducer.

In a further advantageous configuration of the control and evaluation device according to the disclosure, it is provided that when several damping pulses are applied to the terminals of the integrated circuit, their energy can be changed, in particular reduced from damping pulse to damping pulse.

In a further advantageous configuration of the control and evaluation device according to the disclosure, it is provided that an operating point setting circuit is arranged between the two input terminals of the amplifier, which circuit has two resistors of equal size and therebetween a potential terminal to which the center potential of the evaluation voltage range to be processed by the amplifier is applied, which range in turn is between 0 V and a few volts, in particular between 0 V and 10 V or between 0 V and 8 V or between 0 V and 5 V or between 0 V and 3.3 V.

BRIEF DESCRIPTION OF THE DRAWINGS

The disclosure is explained in more detail below by means of several examples and with reference to the drawing. In the Figures.

DESCRIPTION

Figure 1:
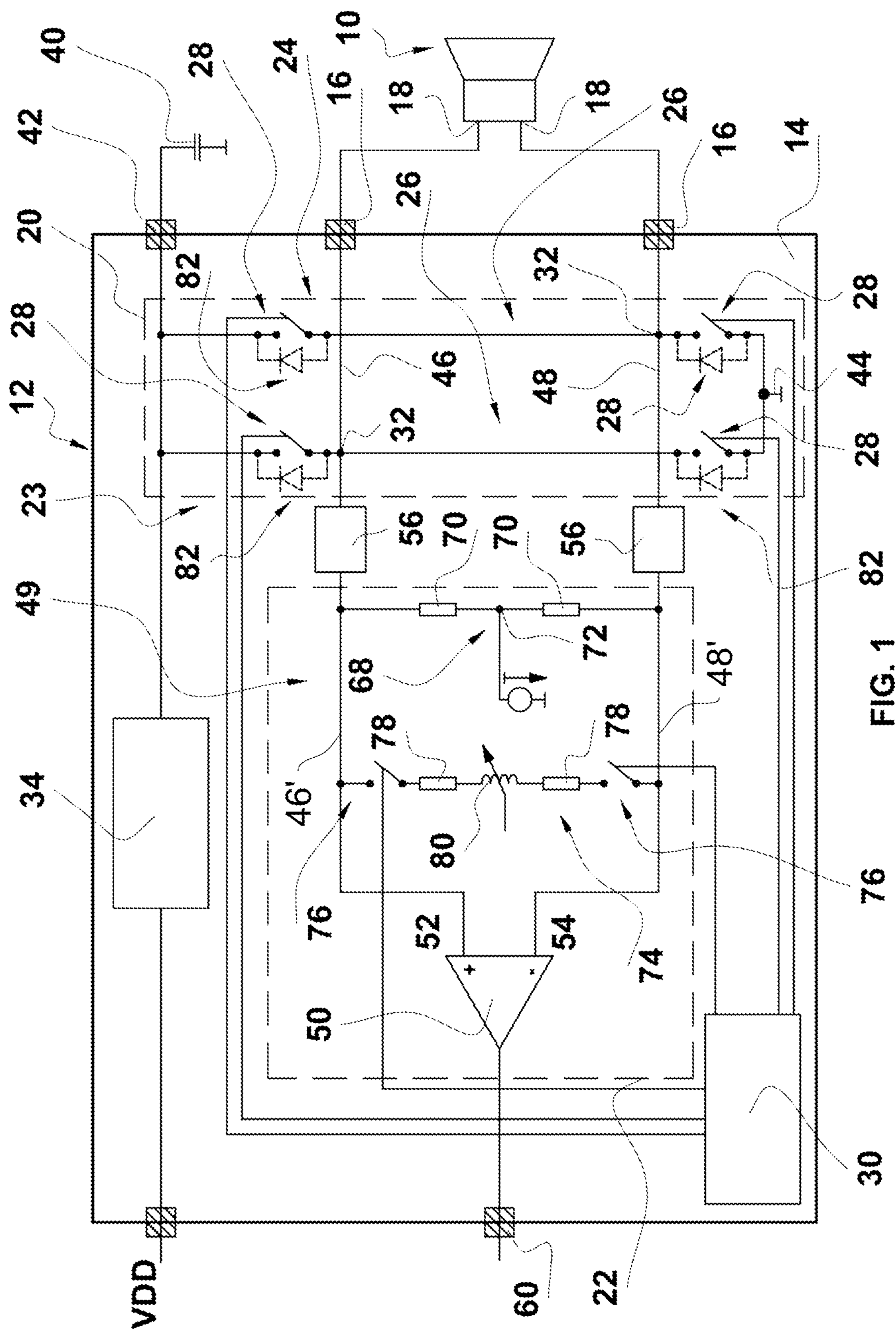
FIG. 1 is a schematic view of the general structure of the integrated circuit for the control of an ultrasonic transducer and the at least first processing of evaluation voltages as a result of echo signals received from the ultrasonic transducer.

FIG. 1 shows the general structure of the circuit concept according to the disclosure for controlling an ultrasonic transducer 10 to be operated without a voltage converter for the purpose of emitting ultrasonic burst signals and for the at least first processing of evaluation voltages of the ultrasonic transducer 10 which are applied to the ultrasonic transducer 10 as a result of receiving echo signals. The circuit 12 is integrated in a semiconductor chip 14, wherein one feature of this semiconductor chip 14 is that only two IC terminals 16, which are each connected to the two transducer terminals 18 of the ultrasonic transducer 10, are required to connect the external ultrasonic transducer 10.

The integrated circuit 12 comprises a control or high-voltage circuit part 20 and an evaluation or low-voltage circuit part 22. Both circuit parts 20 and 22, respectively, are internally connected to the IC terminals 16. The control or high-voltage circuit part 20 comprises a control unit 23 with a full bridge circuit 24 including two half bridge circuits 26. Each of these half bridge circuits 26 in turn has, in a known manner, two semiconductor driving switches 28 which are alternately controlled by a control unit 30 and which are interconnected in a known manner, wherein their respective circuit nodes 32 are connected to the IC terminals 16 between the two semiconductor driving switches 28. In this example, the control voltage, which may range from 40V to 150V, is provided by a charge pump circuit 34, which is connected to a supply voltage VDD and in turn supplies an external charge capacitor 40 connected to a third terminal pad 42 of the semiconductor chip 14. The full bridge circuit 24 is internally arranged between the charge pump circuit 34 and a reference potential, such as ground 44.

Each of the two half bridge circuits 26 is connected at its respective circuit node 32 between its two semiconductor driving switches 28 to a different one of the two IC terminals 16 by a connection line 46 and 48, respectively. Furthermore, an evaluation unit 49 of the evaluation or low-voltage circuit part 22 is also connected to these two IC terminals 16. The evaluation unit 49 comprises an amplifier 50 whose two inputs 52, 54 are connected to the connection lines 46', 48' which are connected either to the circuit nodes 32 and thus indirectly, namely via the connection lines 46, 48 to the IC terminals 16, or directly thereto. Voltage limiting elements 56 are located between the circuit parts 20 and 22 of the semiconductor chip 14 in each connection line 46', 48', which either provide for an isolation of the evaluation or low-voltage circuit part 22 from the high-voltage circuit part 20 in the control phase of the ultrasonic transducer 10, or at least for a voltage limitation to a voltage of a few volts which is applied to the inputs 52, 54 of the amplifier 50 during the control phase of the ultrasonic transducer 10.

This type of electrical protection of the evaluation or low-voltage circuit part 22 from excessive voltages in the control phase of the ultrasonic transducer 10 makes it possible both to apply the high control voltages to the IC terminals 16 and to tap the comparatively low evaluation voltages at the IC terminals 16.

Figure 2:
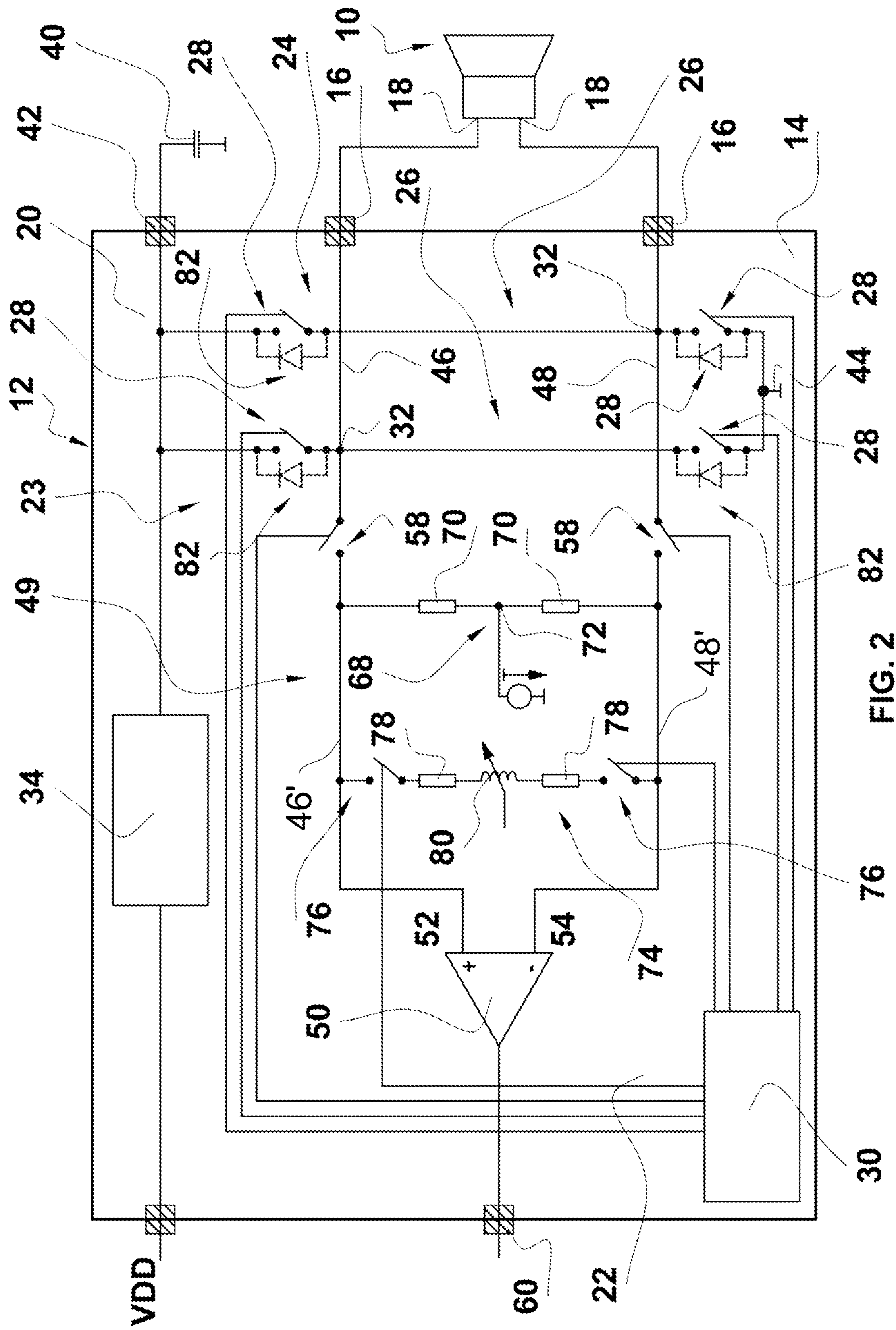
FIG. 2 is a first example of the realization of the voltage limiting elements for decoupling the control part from the evaluation part of the integrated circuit.

FIG. 2 shows that the voltage limiting elements 56 can be designed as isolating semiconductor switches 58 which, like the semiconductor driving switches 28, can be controlled by the control unit 30. Thus, the control unit 30 opens the isolating semiconductor switches 58 in the control phase in which it alternately opens and closes the semiconductor driving switches 28, as is usual in a full bridge circuit per se, so that the ultrasonic transducer 10 is supplied with the comparatively high electrical energy necessary to emit ultrasonic burst signals. Temporally after the control phase, the ultrasonic transducer 10 changes its function in the reception phase by converting received echo signals into electrical evaluation voltages. In this reception phase, the control unit 30 opens all semiconductor driving switches 28 and closes the isolating semiconductor switches 58 so that the evaluation voltage now applied to the IC terminals 16 can be amplified by the amplifier 50. For example, the amplified evaluation voltage then reaches a further evaluation unit, which is not shown here, via a further terminal pad 60.

Figure 3:
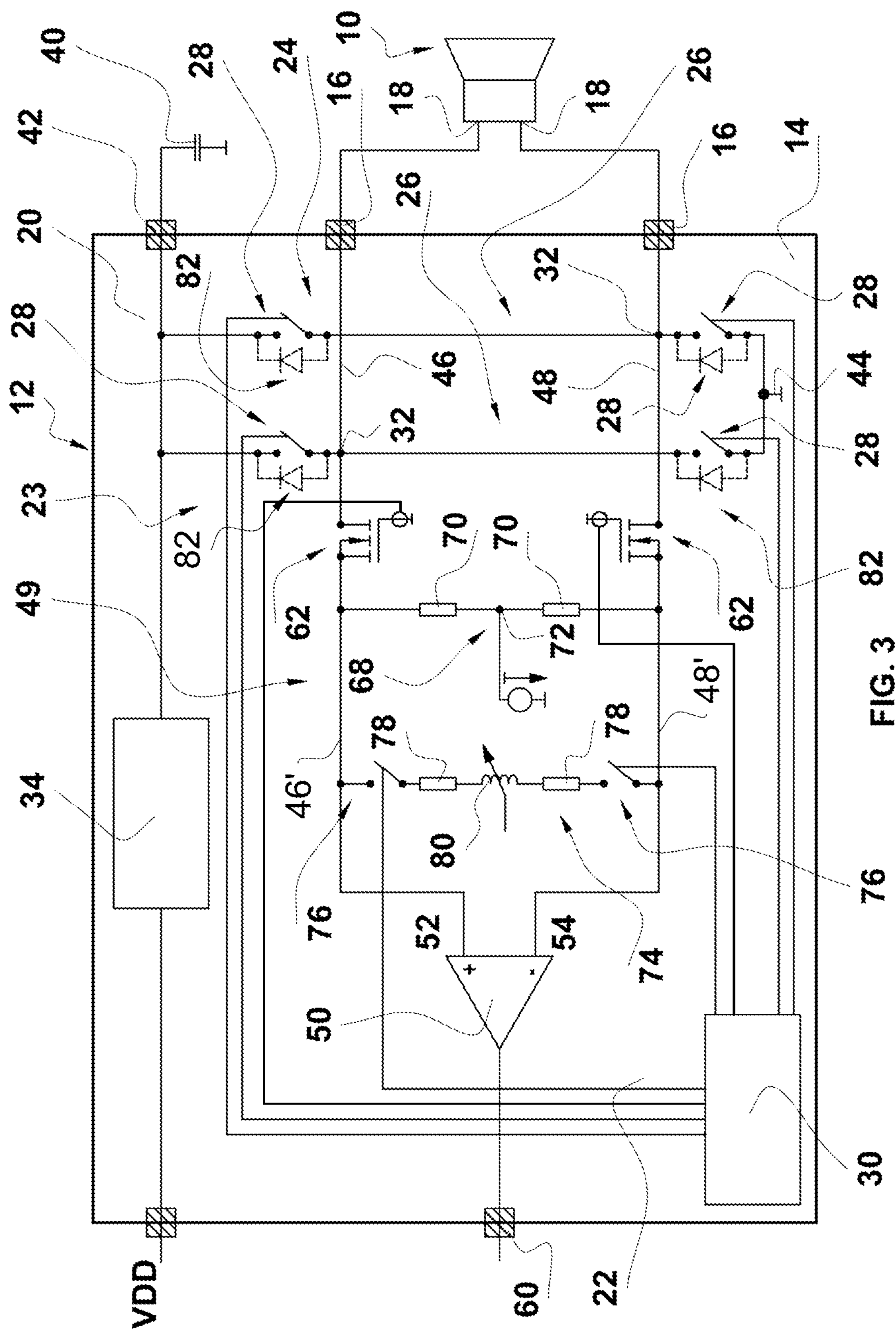
FIG. 3 is a second example of the realization of the voltage limiting elements for decoupling the control part from the evaluation part of the integrated circuit.

In FIG. 3 it can be seen that the two voltage limiting elements 56 are implemented as MOSFET transistors 62 switched as source followers. The gates of both MOSFET transistors 62 are supplied with a low voltage, as is generally known for FET transistors switched as source followers. Thus, in this way, voltage limiting is performed to a low-voltage value selected to be higher than the evaluation voltages output by the ultrasonic transducer 10 in its reception phase.

Figure 4:
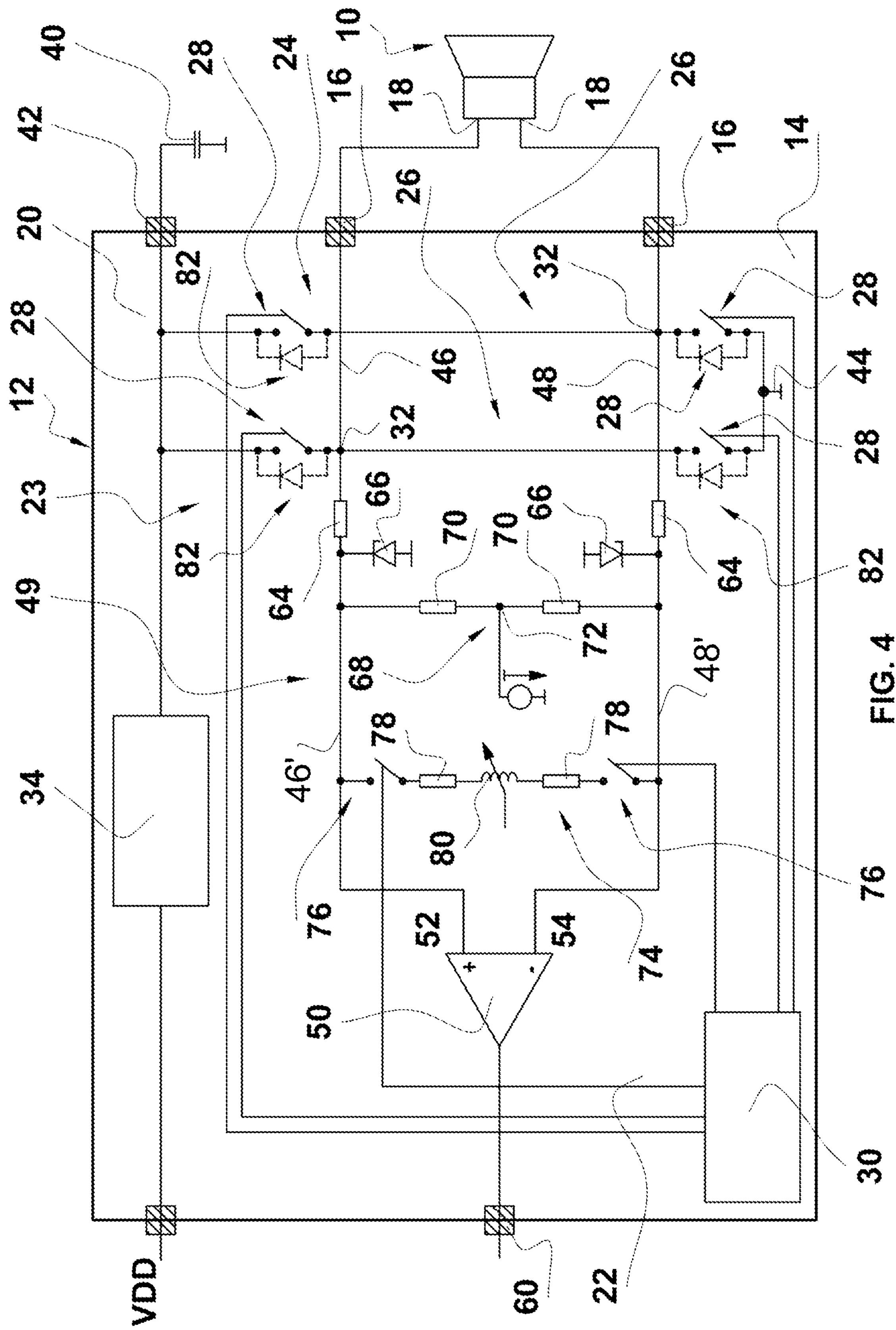
FIG. 4 is a third example of the realization of the voltage limiting elements for decoupling the control part from the evaluation part of the integrated circuit.

A third variant of the design of the voltage limiting elements 56 is shown in FIG. 4 Here, each voltage limiting element 56 is implemented by a circuit comprising a resistor 64 with a voltage limiting diode 66 connected against a reference potential in the form of a Zener diode, for example. The resistors 64 are arranged in the terminal lines 46', 48'.

In FIG. 1, but also in the other FIGS. 2 to 4, two further circuits are shown as part of the evaluation unit 49, of which circuit 68 serves to set the operating point of amplifier 50. The circuit 68 has two resistors 70 connected as a series circuit between the two connection lines 46, 48 and into whose connection node 72 the center voltage of the voltage range within which the evaluation voltages move is fed.

The second additional circuit 74 serves to damp the ultrasonic transducer 10 in its decay phase, which follows its control phase and should be as short as possible. This damping circuit 74 is selectively switched on via two semiconductor switches 76 and, like circuit 68, is located between connection lines 46' and 48'. The normally open semiconductor switches 76 are closed during the decay phase of the ultrasonic transducer 10 and are otherwise opened, which may be done, for example, by controlling the control unit 30. In this example, the damping circuit 74 itself has a damping coil 80 in addition to two damping resistors 78, which are connected together in series.

The concept according to the disclosure succeeds in limiting the number of IC terminals 16 for the ultrasonic transducer 10 to the necessary minimum of two pads. The ultrasonic transducer 10 is protected against ESD discharges by allowing the parasitic free-wheeling diodes 82 of the semiconductor driving switches 28, shown in dashed lines, to divert electrical charge from the ultrasonic transducer 10 to either the reference potential (ground 44) or the charge capacitor 40.

LIST OF REFERENCE SYMBOLS

10 ultrasonic transducer
12 integrated circuit of semiconductor chip
14 semiconductor chip
16 IC connection of semiconductor chip
18 transducer connection of ultrasonic transducer
20 control or high-voltage circuit part
22 evaluation or low-voltage circuit part
23 control unit of control or high-voltage circuit part
24 full bridge circuit of control unit
26 half bridge circuit of full bridge circuit
28 semiconductor driving switch
30 control unit
32 circuit node
34 charge pump circuit
40 charging capacitor
42 terminal pad
44 ground
46 connection line
46' terminal line
48 connection line
48' terminal line
49 evaluation unit
50 amplifier
52 input of amplifier
54 input of amplifier
56 voltage limiting element
58 isolating semiconductor switch
60 terminal pad
62 MOSFET transistors
64 resistor
66 voltage limiting diode
68 circuit for adjusting operating point of amplifier
70 resistors
72 connection nodes between resistors
74 damping circuit
76 semiconductor switch
78 damping resistors
80 damping coil
82 parasitic free-wheeling diodes of semiconductor driving switches

What is claimed is:

1. A device for controlling an ultrasonic transducer and for evaluating measuring signals delivered by the ultrasonic transducer, comprising:

an integrated circuit having two IC terminals led to an outside of the integrated circuit for electrical connection to the ultrasonic transducer, wherein an alternately reversible control voltage can be applied to the two IC terminals of the integrated circuit for emitting an ultrasonic burst signal in a control phase, and an evaluation voltage which can be output by the ultrasonic transducer is applied to the two IC terminals of the integrated circuit when an ultrasonic echo signal is received in a reception phase, wherein the evaluation voltage is in a low-voltage range of more than 0 V and up to 10 V, and the control voltage is in a high-voltage range, which comprises voltages that are greater than those of the low-voltage range by up to two powers of ten, a control unit formed as a component of the integrated circuit for generating the control voltage, wherein the control unit is provided with a full bridge circuit arranged between a supply potential and a reference potential, in particular ground, with two half bridge circuits each having two semiconductor driving switches, whose two circuit nodes each connecting two semiconductor driving switches are electrically connected to the two IC terminals of the integrated circuit, an evaluation unit formed as a component of the integrated circuit with an amplifier processing evaluation voltages in the low-voltage range with two input terminals which are electrically connected to the two IC terminals of the integrated circuit, a voltage limiting element in each electrical connection between the input terminals of the amplifier and the two IC terminals of the integrated circuit, wherein both voltage limiting elements limit the voltage applied to the input terminals of the amplifier to a value in the low-voltage range, wherein the voltage limiting elements are each designed as FET transistors switched as source followers that continuously limit the voltage at the input terminals of the amplifier by clamping the voltage to a value in the low-voltage range, a control unit formed as a component of the integrated circuit for controlling the semiconductor driving switches, wherein, for applying the control voltage to the IC terminals of the integrated circuit, alternately two semiconductor driving switches of the four semiconductor driving switches, can be switched on and two semiconductor driving switches of the four semiconductor driving switches can be switched off, and wherein for evaluating the evaluation voltage applied to the IC terminals of the integrated circuit, the four semiconductor driving switches are switched off.

2. The device according to claim 1, wherein the voltage limiting elements are each designed as an isolating semiconductor switch which can be controlled by the control unit and is arranged in one of the electrical connections between the input terminals of the amplifier and the IC terminals of the integrated circuit for selectively isolating and closing the electrical connections between the input terminals of the amplifier and the IC terminals of the integrated circuit of the ultrasonic transducer, wherein the isolating semiconductor switches are switched off for supplying the IC terminals of the integrated circuit with the control voltage and are switched on for evaluating the evaluation voltage applied to the IC terminals of the integrated circuit.

3. The device according to claim 1, including a damping circuit which is formed as a component of the integrated circuit, is arranged in parallel with the two input terminals of the amplifier and has two further semiconductor switches by means of which the damping circuit can be connected to or disconnected from respectively one of the electrical connections between the input terminals of the amplifier and the IC terminals of the integrated circuit, wherein the two further semiconductor switches can be controlled by the control unit and are switched off during supply of the IC terminals of the integrated circuit with the control voltage, are switched on thereafter and before the evaluation of the evaluation voltage applied to the IC terminals of the integrated circuit for damping a decay of the ultrasonic transducer in a decay phase, and are switched off again during the evaluation of the evaluation voltage applied to the IC terminals of the integrated circuit.

4. The device according to claim 1, including a damping circuit which is formed as a component of the integrated circuit, is arranged in parallel with the two input terminals of the amplifier and has two further semiconductor switches by means of which the damping circuit can be connected to or disconnected from respectively one of the electrical connections between the input terminals of the amplifier and the IC terminals of the integrated circuit, wherein the two further semiconductor switches can be controlled by the control unit and are switched off during supply of the IC terminals of the integrated circuit with the control voltage, are switched on thereafter and before the evaluation of the evaluation voltage applied to the IC terminals of the integrated circuit for damping a decay of the ultrasonic transducer in a decay phase, and are switched off again during the evaluation of the evaluation voltage applied to the IC terminals of the integrated circuit, wherein the damping circuit has at least one resistor and/or at least one inductance.

5. The device according to claim 1, wherein the control unit controls the semiconductor driving switches after supplying the IC terminals of the integrated circuit with the control voltage and before evaluating the evaluation voltage applied to the IC terminals of the integrated circuit for generating single or double or multiple damping pulses, which can be applied to the ultrasonic transducer for damping a decay in a decay phase in a phase-shifted manner and particularly in phase opposition to the decay of the ultrasonic transducer.

6. The device according to claim 1, wherein the control unit controls the semiconductor driving switches after supplying the IC terminals of the integrated circuit with the control voltage and before evaluating the evaluation voltage applied to the IC terminals of the integrated circuit for generating single or double or multiple damping pulses, which can be applied to the ultrasonic transducer for damping a decay in a decay phase in a phase-shifted manner and particularly in phase opposition to the decay of the ultrasonic transducer, wherein, when several damping pulses are applied to the IC terminals of the integrated circuit, their energy can be changed, in particular reduced from damping pulse to damping pulse.

7. The device according to claim 1, wherein an operating point setting circuit is arranged between the two input terminals of the amplifier, wherein the operating point setting circuit has two resistors of equal size and therebetween a potential terminal to which a center potential of an evaluation voltage range to be processed by the amplifier is applied, which range in turn is between 0 V and 10 V.

8. An ultrasonic measuring device, comprising:

a controllable ultrasonic transducer without voltage converter which has two transducer terminals to which an alternately reversible control voltage can be applied for emitting an ultrasonic burst signal in a control phase and to which an evaluation voltage is applied when an ultrasonic echo signal is received in a reception phase, wherein the controllable ultrasonic transducer decays in a decay phase between the control phase and the reception phase, wherein the evaluation voltage is in a low-voltage range of more than 0 V and up to 10 V, and the control voltage is in a high-voltage range, which comprises voltages that are greater than those of the low-voltage range by up to two powers of ten, a control unit for generating the control voltage, wherein the control unit is provided with a full bridge circuit arranged between a supply potential and a reference potential, in particular ground, with two half bridge circuits each having two semiconductor driving switches, whose two circuit nodes each connecting two semiconductor driving switches are each connected via a connection line to the two transducer terminals of the controllable ultrasonic transducer, an evaluation unit with an amplifier processing evaluation voltages in the low-voltage range with two input terminals which are electrically connected to the two circuit nodes of the half bridge circuit of the control unit via terminal lines, a voltage limiting element in each of the terminal lines, wherein both voltage limiting elements limit the voltage applied to the input terminals of the amplifier to a value in the low-voltage range, wherein the voltage limiting elements are each designed as FET transistors switched as source followers that continuously limit the voltage at the input terminals of the amplifier by clamping the voltage to a value in the low-voltage range, a control unit for controlling the semiconductor driving switches, wherein, for supplying the controllable ultrasonic transducer with the control voltage for emitting the ultrasonic burst signal, alternately two semiconductor driving switches of four semiconductor driving switches, can be switched on and the two semiconductor driving switches can be switched off, and wherein for evaluating the evaluation voltage applied to the transducer terminals of the controllable ultrasonic transducer, the four semiconductor driving switches are switched off.

9. The ultrasonic measuring device according to claim 8, wherein the voltage limiting elements are each designed as an isolating semiconductor switch which can be controlled by the control unit and is arranged in one of the connection lines for selectively isolating and closing the connection lines between the input terminals of the amplifier and the transducer terminals of the controllable ultrasonic transducer, wherein the isolating semiconductor switches are switched off for supplying the controllable ultrasonic transducer with the control voltage and are switched on for evaluating the evaluation voltage applied to the transducer terminals of the controllable ultrasonic transducer.

10. The ultrasonic measuring device according to claim 8, including a damping circuit which is arranged in parallel with the two input terminals of the amplifier and has two further semiconductor switches by means of which the damping circuit can be connected to or disconnected from respectively one of the connection lines, wherein the two further semiconductor switches can be controlled by the control unit and are switched off during the supply of the controllable ultrasonic transducer with the control voltage, are switched on thereafter and before the evaluation of the evaluation voltage applied to the transducer terminals of the controllable ultrasonic transducer for damping a decay of the controllable ultrasonic transducer in the decay phase, and are switched off again during the evaluation of the evaluation voltage applied to the transducer terminals of the controllable ultrasonic transducer.

11. The ultrasonic measuring device according to claim 8, including a damping circuit which is arranged in parallel with the two input terminals of the amplifier and has two further semiconductor switches by means of which the damping circuit can be connected to or disconnected from respectively one of the connection lines, wherein the two further semiconductor switches can be controlled by the control unit and are switched off during the supply of the controllable ultrasonic transducer with the control voltage, are switched on thereafter and before the evaluation of the evaluation voltage applied to the transducer terminals of the controllable ultrasonic transducer for damping a decay of the controllable ultrasonic transducer in the decay phase, and are switched off again during the evaluation of the evaluation voltage applied to the transducer terminals of the controllable ultrasonic transducer, wherein the damping circuit has at least one resistor and/or at least one inductance.

12. The ultrasonic measuring device according to claim 8, wherein the control unit controls the semiconductor driving switches after supplying the controllable ultrasonic transducer with the control voltage and before evaluating the evaluation voltage applied to the transducer terminals of the controllable ultrasonic transducer for generating single or double or multiple damping pulses, which can be applied to the controllable ultrasonic transducer for damping its decay in the decay phase in a phase-shifted manner and particularly in phase opposition to the decay of the controllable ultrasonic transducer.

13. The ultrasonic measuring device according to claim 8, wherein the control unit controls the semiconductor driving switches after supplying the controllable ultrasonic transducer with the control voltage and before evaluating the evaluation voltage applied to the transducer terminals of the controllable ultrasonic transducer for generating single or double or multiple damping pulses, which can be applied to the controllable ultrasonic transducer for damping its decay in the decay phase in a phase-shifted manner and particularly in phase opposition to the decay of the controllable ultrasonic transducer, wherein several damping pulses are applied to the controllable ultrasonic transducer, their energy can be changed, in particular reduced from damping pulse to damping pulse.

14. The ultrasonic measuring device according to claim 8, wherein an operating point setting circuit is arranged between the two input terminals of the amplifier, which circuit has two resistors of equal size and therebetween a potential terminal to which a center potential of an evaluation voltage range to be processed by the amplifier is applied, which range in turn is between 0 V and 10 V.

* * * * *